A. LARSON.
Improvement in Coffee Roasters.
No. 125,579. Patented April 9, 1872.
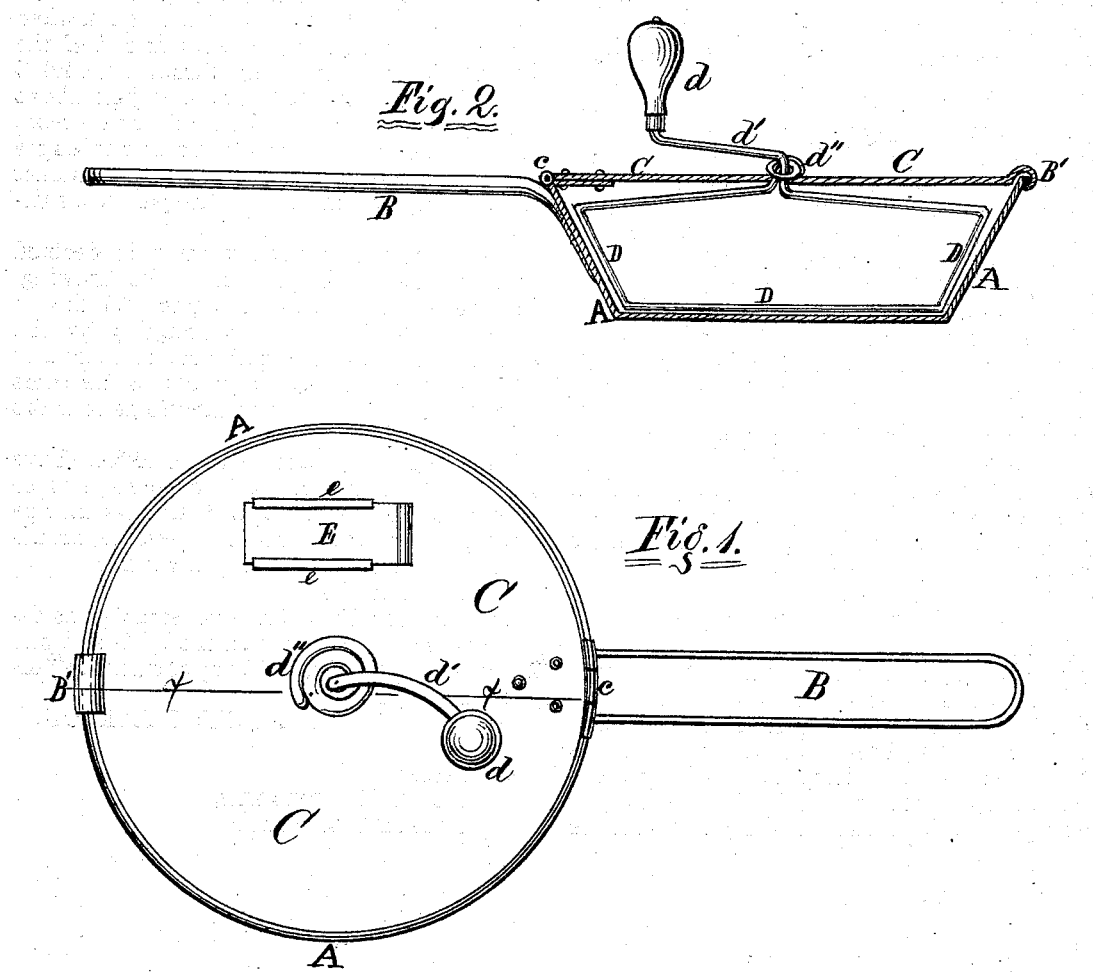

125,579

UNITED STATES PATENT OFFICE.

AUGUST LARSON, OF GALESBURG, ILLINOIS.

IMPROVEMENT IN COFFEE-ROASTERS.

Specification forming part of Letters Patent No. 125,579, dated April 9, 1872.

SPECIFICATION.

I, AUGUST LARSON, of Galesburg, in the county of Knox and State of Illinois, have invented certain Improvements in Coffee-Roasters, of which the following is a specification:

Nature and Objects of the Invention.

The nature of my invention relates to improvements in that class of coffee-roasters in which a lid is pivoted or hinged to a common pan, and a stirrer is provided with suitable bearings in the center of said lid; and the invention consists in constructing the stirrer of a single piece of wire bent in such form as to produce a complete stirring device; and also to secure the stirrer in the lid and furnish a journal for the handle; all as hereinafter fully described.

Description of the Accompanying Drawing.

Figure 1 is a top plan or view of a roaster embodying my invention. Fig. 2 is a vertical cross-section of Fig. 1 on the line $x\ x$, and showing that part of the stirrer where it passes through the lid, in perspective.

General Description.

A is an ordinary metallic spit or pan, and B the handle thereof. C is a lid hinged to the pan A at $c$, and provided with a catch, B', which engages with the edge of the pan and holds the lid secure when closed. D is the stirrer, formed of a single piece of wire, and bent as shown at Fig. 2, one end projecting up through the lid C and forming a journal for the handle $d$, and also a crank, $d'$. The lower end of the wire $d$ is bent into an oblong rectangular form, as shown at Fig. 2, so that its lower part will sweep the bottom of the pan A when the crank $d'$ is turned. The lower end of the wire D is then passed up through the lid C and coiled around that part of it just above the lid, so as to form a suitable collar thereon, as shown at $d''$. E is a slide running in ledges $e\ e$, and may be adjusted to enlarge or contract the opening beneath it into the pan A, as desired.

The operation of my invention is deemed obvious from an inspection of the drawing. The coffee being put in the pan and the lid closed, it may be stirred thoroughly by the wire D, which, sweeping the entire bottom of the pan, will turn every grain; at the same time its construction is so simple as to make it very cheap.

I am aware that stirrers made of wire have been used before for like purposes; but so constructed as to require journal-bearings secured to the pan. I do not, therefore, broadly claim a wire stirrer as my invention.

What I claim is—

The wire stirrer D, when constructed as described, and combined with the lid C and pan A, substantially as described, and for the purpose specified.

AUGUST LARSON.

Witnesses:
  PLATT R. RICHARDS,
  JOSEPH STAFFORD.